I. KARISH.
EXTENSION TABLE.
APPLICATION FILED JULY 13, 1912.
1,135,115.
Patented Apr. 13, 1915.
4 SHEETS—SHEET 1.
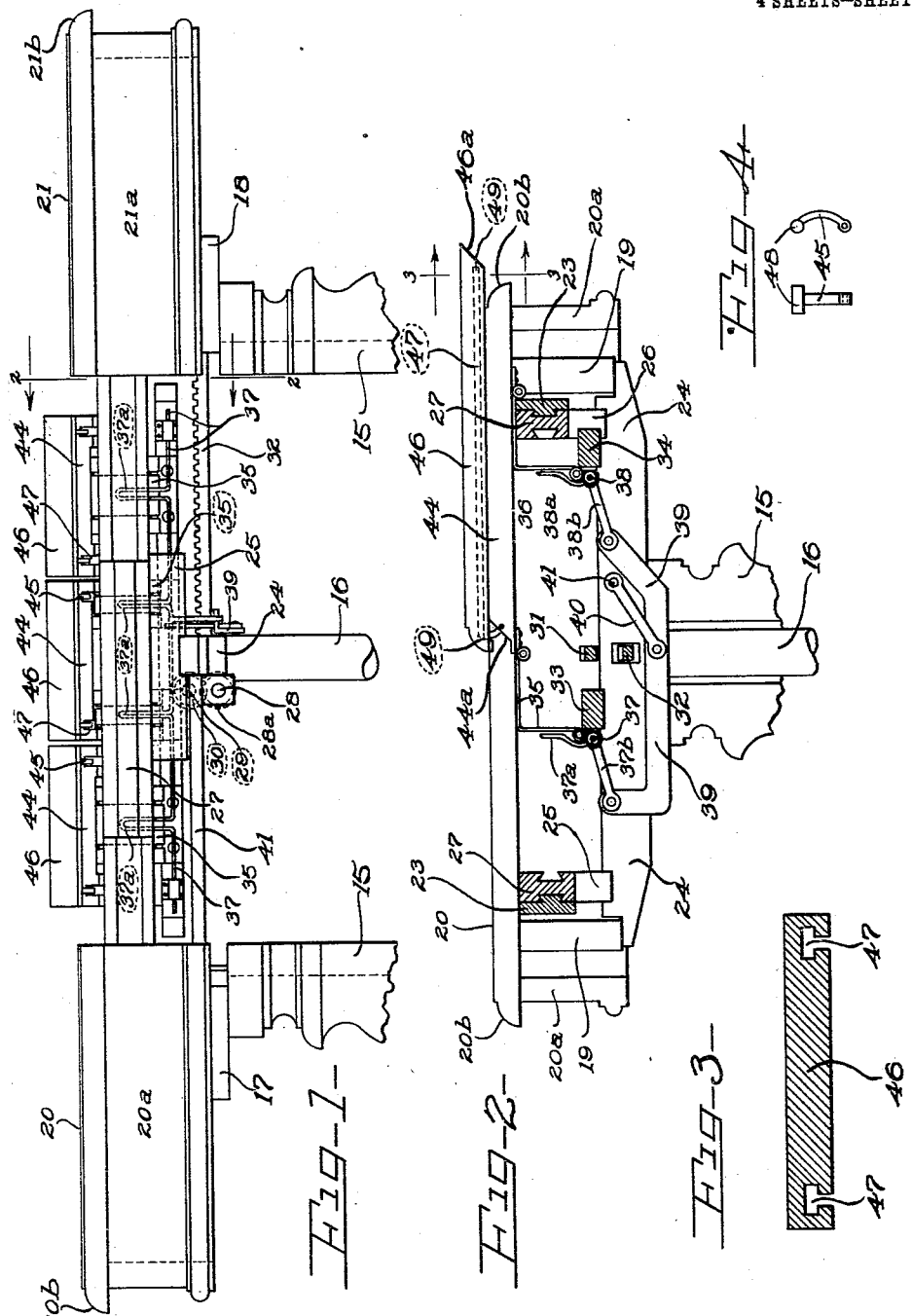
Witnesses:
Thomas J. Morgan, Jr.
Gustave T. Fraenckel
Inventor
Isaac Karish
By Morgan & Rubinstein
Attys

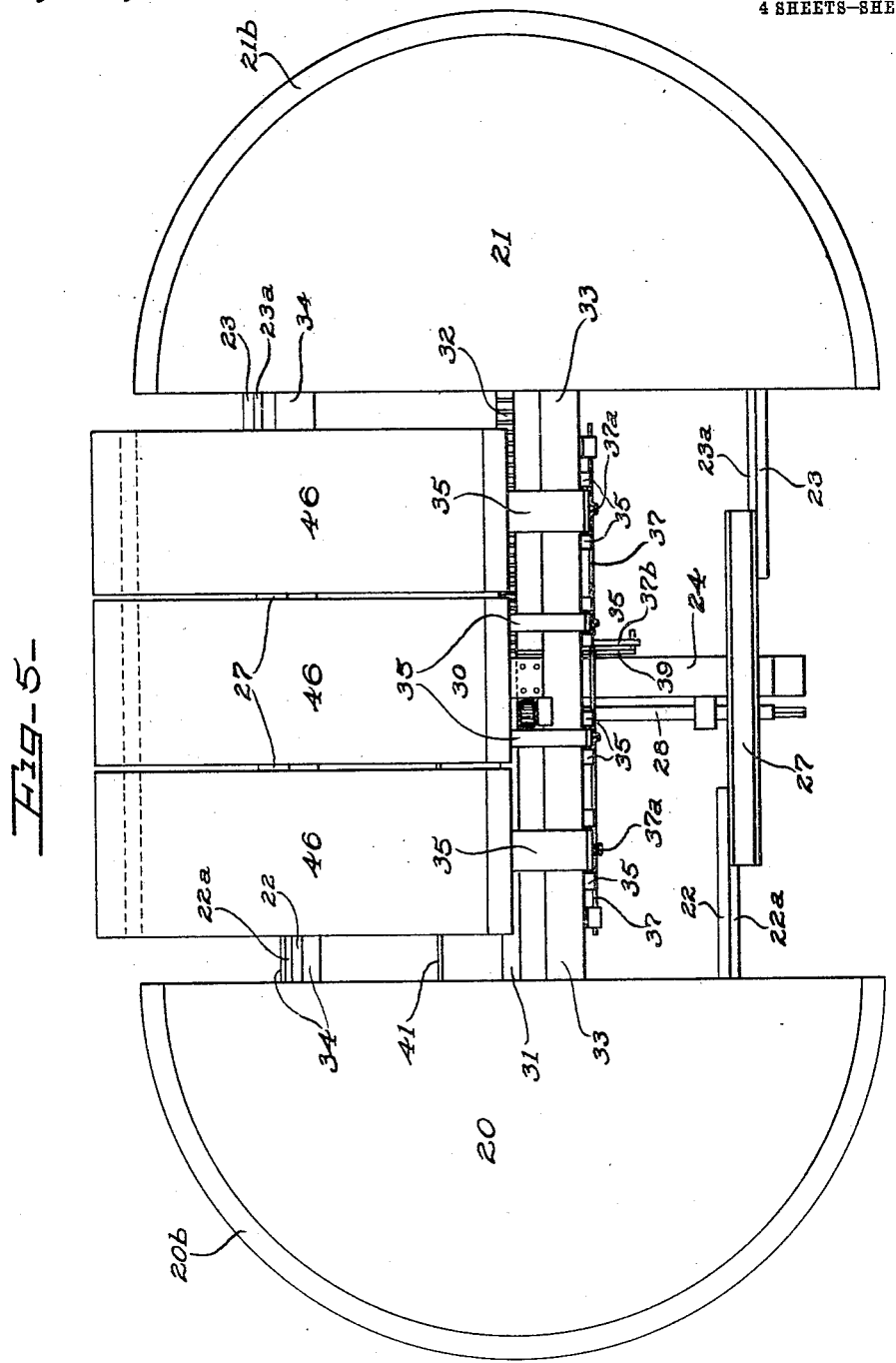

I. KARISH.
EXTENSION TABLE.
APPLICATION FILED JULY 13, 1912.
1,135,115.
Patented Apr. 13, 1915.
4 SHEETS—SHEET 3.
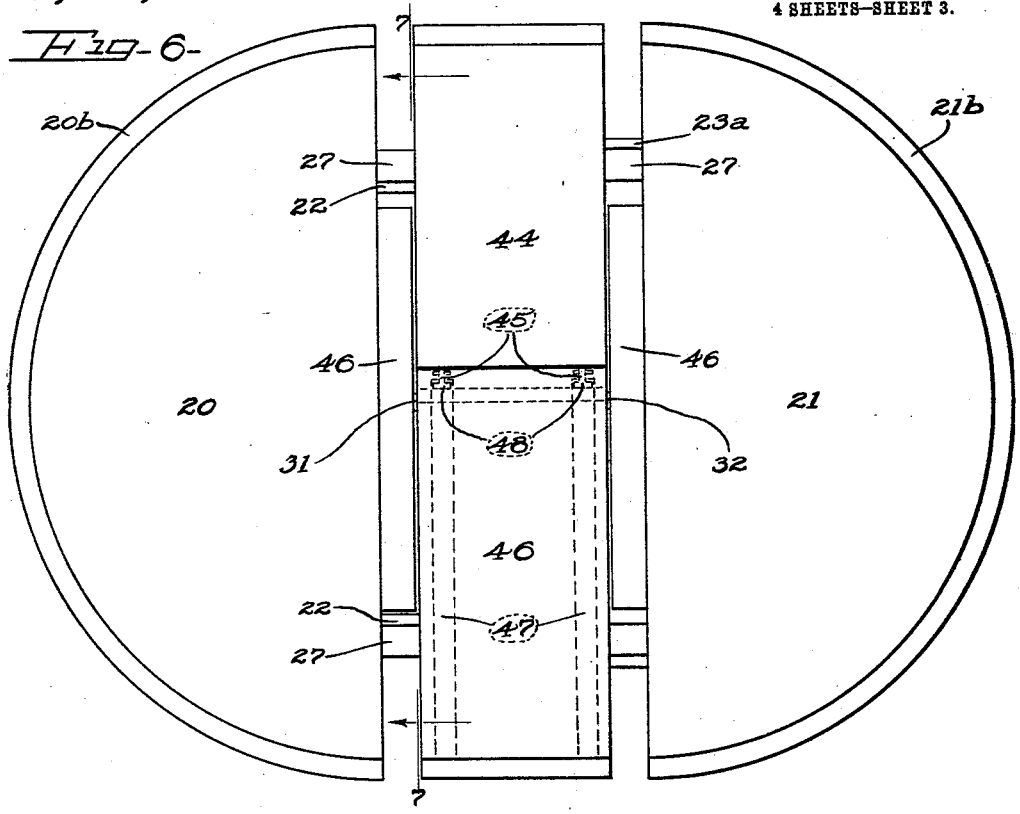
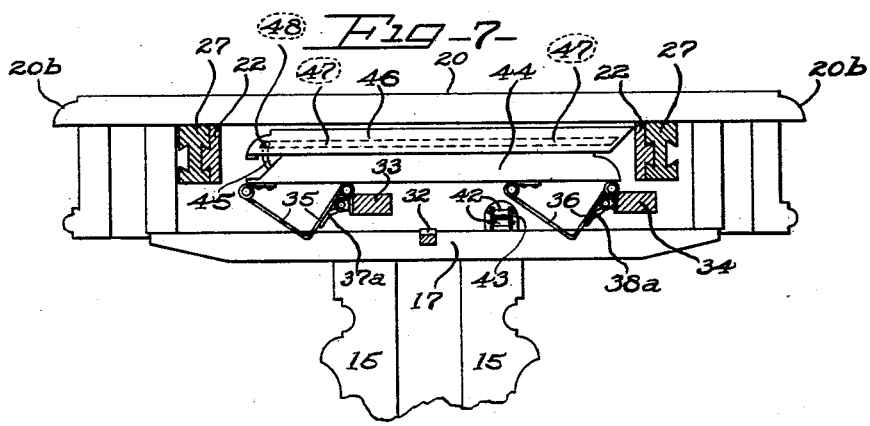
Witnesses:
Thomas J. Morgan, Jr.
Gustave T. Fraenckel
Inventor—
Isaac Karish—
By Morgan & Rubinstein
Attys—

I. KARISH.
EXTENSION TABLE.
APPLICATION FILED JULY 13, 1912.
1,135,115.
Patented Apr. 13, 1915.
4 SHEETS—SHEET 4.
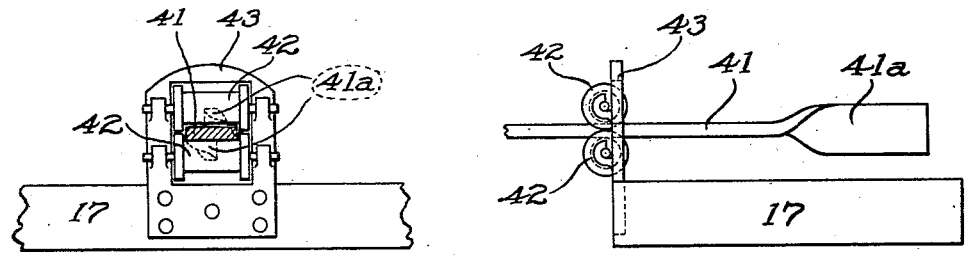
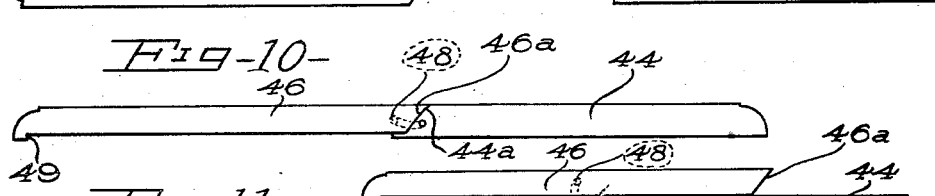
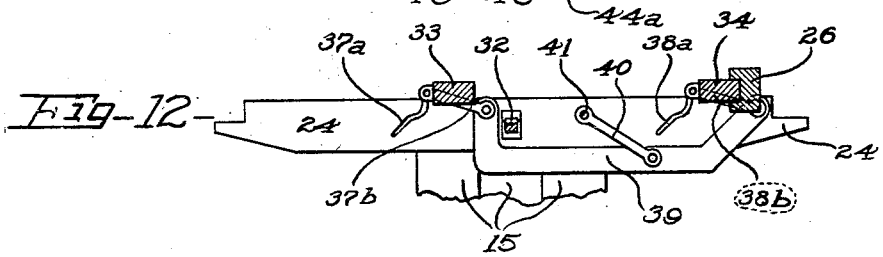
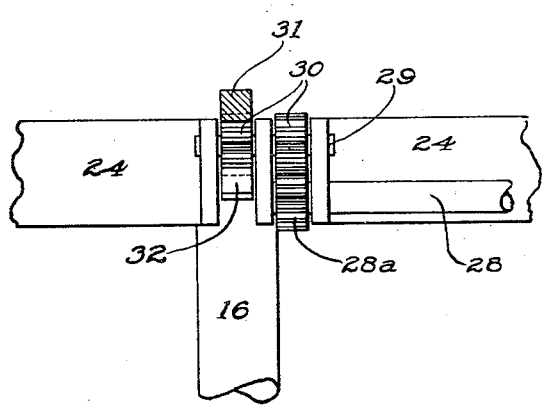
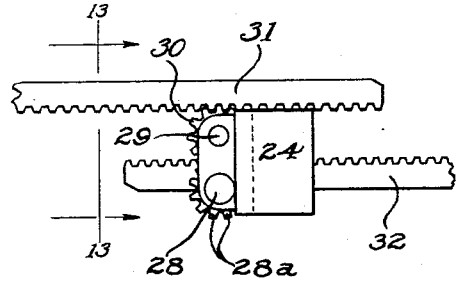
Witnesses:
Thomas J. Morgan Jr.
Gustave T. Fraenckel
Inventor—
Isaac Karish
By Morgan & Rubinstein
Attys

UNITED STATES PATENT OFFICE.

ISAAC KARISH, OF CHICAGO, ILLINOIS, ASSIGNOR OF ONE-HALF TO TODRESS NAKTIN, OF CHICAGO, ILLINOIS.

EXTENSION-TABLE.

1,135,115.  Specification of Letters Patent.  Patented Apr. 13, 1915.

Application filed July 13, 1912. Serial No. 709,278.

*To all whom it may concern:*

Be it known that I, ISAAC KARISH, a subject of the Czar of Russia, and a resident of Chicago, in the county of Cook and State of Illinois, have invented a new and useful Improvement in Extension-Tables, of which the following is a specification.

The object of my invention is to improve the means by which the movable leaves are supported within the table, are automatically raised by the extension of the table, and the adjustment of the leaves in position between the main parts of the table when extended.

The manner in which I accomplish my object is described in the following specification and illustrated in the accompanying drawings in which:—

Figure 1 is a side elevation the legs being broken away, the table extended, and leaves raised to the highest level ready for adjustment between the ends of the table. Fig. 2, is a cross section on the line 2—2 Fig. 1. Fig. 3, is a sectional detail on the line 3—3 Fig. 2. Fig. 4, represents two views of a link. Fig. 5, is a plan of the parts and their positions shown in Fig. 1. Fig. 6, is a plan of the table and one of the leaves in position for the closing of the two ends into contact with the leaf. Fig. 7, is a vertical cross section on the line 7—7 Fig. 6. Figs. 8, and 9, are front and side elevations of guide rolls and support. Figs. 10 and 11 are details of the leaves of the table and their relative position for adjustment. Fig. 12, is a detail, showing part of the lever mechanism. Figs. 13, and 14, are details of the rack mechanism.

In the drawings 15 indicates the two halves of the main supporting leg and 16 the center leg inclosed within the leg 15, when the table is closed. Fixed on each half of the leg 15 are the transverse supports 17 and 18. Secured to these supports are vertical blocks 19. Secured on these blocks are semi-circular parts 20 and 21 which form the main top of the table. Each of these parts consists of a ring portion $20^a$ and $21^a$, and tops $20^b$ and $21^b$.

Rigidly fixed to the underside of the top $20^b$, are guide rails 22 having an outside dovetailed tongue $22^a$. Fixed on the underside of the table top $21^b$, and on the blocks 19, are rails 23 having an inside dovetailed tongue $23^a$. Fixed on the top of the leg 16, is a transverse support 24. Fixed on the support 24 are longitudinal blocks 25, and 26. Secured on the blocks 25 and 26 are double grooved rails 27, in which the tongues $22^a$ and $23^a$ of the rails 22 and 23 are slidably engaged. These rails form the slidable extension connections of the table. Supported on one side of the support 24, is a shaft 28. Fixed on this shaft is a gear $28^a$. Above the shaft 28, and parallel with it, is a short shaft 29, on which are two gear wheels 30, one of which is meshed with the gears $28^a$ on the shaft 28. Meshed with the gears 30 are parallel racks 31, and 32. One end of the rack 31 is fixed on the support 17 and the end of the rack 32 is fixed on the support 18. Those parts of the racks in engagement with the gears are slidably held meshed with the gears by bearings secured on the support 24. The rotation of the shaft 28, gears $28^a$, and 30, move the racks in opposite directions and thereby force the portion 20, and 21 of the table apart and the reverse movement draws them together. Fixed transversely on the support 24, are two parallel rails 33, and 34. Secured to these rails are hinges 35 and 36. Supported on the same rails below the hinges are rocker rods 37 and 38. Each of these rods have radial arms $37^a$, and $38^a$ corresponding in number with the hinges 35 and 36, and each rod has an arm $37^b$, and $38^b$. Pivotally attached to the arms $37^b$ and $38^b$, is a connecting bar 39. Pivotally attached to this bar is an arm 40. This arm is secured to a rocker bar 41, which is pivotally supported in the support 24. This bar extends parallel with the rack 31, and between the rolls 42, which are rotatably supported in the bearing plates 43 attached to the part 17. The portion of the bar 41 which passes between the rolls 42, is flat, and the end portion $41^a$ is twisted. As the twisted part is moved back and forth through the rolls by the opening and closing of the main parts of the table, the rod 41 is partly rotated, and the arm 40, connecting bar 39, and rocker rods 37, and 38, are actuated and the hinges 35 and 36, are raised and lowered. Pivotally secured to the hinges 35 and 36 are half leaves 44. These half leaves are supported in a raised position by said hinges and by the rails 23. Pivotally secured in one end of each of these half leaves 44, are two links 45, shown in Fig. 4. Slidably connected to the half leaves 44, by these links are half leaves 46. On the under side of the leaves 46, are two longitudinal parallel T shaped channels 47 shown in Fig. 3, in which the T ends 48, of the links 45 are slidably engaged. The travel of these links in said channels is limited by stops 49. By this means one half 46 of each leaf is slidably supported on the other half 44 and guided into the open and closed positions. In the open position, the half 44 leaves rest on the hinges 35 and 36 and rails 27. In the closed position the half leaves 46 rest upon the half leaves 44, and the leaves 44 rest on the hinge joints fixed on the rails 33 and 34 as shown in Fig. 7.

When the several parts are constructed and connected as described their operation is as follows:—When the table is closed to form a round table the table leaves are supported between the table tops 20 and 21 as shown in Fig. 7, the lower leaf resting on the hinge joints and the upper leaves resting on the lower leaves. To form the extension table the parts 20 and 21 are drawn apart in the usual way or are forced apart by the rotation of the shaft 28, gears 28ª, 30 and the racks 31 and 32. As the parts are moved to the open position the rolls 42 travel along the flat bar 41. When the twisted end 41ª passes through the rolls the bar is turned in proportion to the degree of the twist of the bar. This turn of the bar takes place when the ends of the table 20 and 21 are separated sufficiently to allow the leaves to be raised between them as follows: As the bar 41 is turned as described, the arm 40 is moved from the position shown in Fig. 12 to the position shown in Fig. 2, and carries with it the connecting bar 39, arms 37ᵇ, and 38ᵇ, thereby partly rotating the rods 37 and 38. This movement of these rods raises the radial arms 37ª and 38ª and hinges 35 and 36 from the position shown in Fig. 7 to the position shown in Fig. 2. In this movement the hinges lift the leaves above the level of the table top and carry them over to one side to the position shown in Fig. 2 where they rest on the rails 22, 23, and 27. The top leaves are then moved by the hand along the top of the lower leaves to the position shown in Figs. 6 and 10. In this movement of those leaves the heads 48 of the links 45, travel in the channels 47 until the ends 46ª of the leaves fall against the beveled ends 44ª of the lower leaves, and rest on the ends 44ª, hinges, and rails 22, 23 and 27. The parts 20 and 21 are then closed against the leaves by the reverse movement of the shaft 21. In this reverse movement the twisted end of the bar 41 passes back through the rolls and thereby returns the connected lever part back to their normal position shown in Fig. 12. The leaves and hinges are thereby freed from contact with those parts. To move the leaves for closing the table, the leaves 46 are pushed onto the top of the leaves 44 into the position shown in Figs. 2 and 11 to the position shown in Fig. 7, and then both leaves together are pushed from the side position to the center where they fall together with the hinges as shown in Fig. 7. The leaves are thereby returned to the first position below the table top, the parts 20 and 21 are then closed by means of the shaft 28, and all parts are in the normal position for a round table as described.

It is obvious that one or more leaves can be raised by hand and placed in position; and that the lifting mechanism is actuated only when the table is extended to the full limit.

What I claim is:—

1. An extension table, comprising a series of table leaves formed transversely in section and normally concealed beneath the table top when the latter is in closed position, the sections of said leaves being slidable longitudinally one upon another, and means for elevating said leaves into position for use.

2. An extension table, comprising a series of table leaves formed transversely in section and normally concealed beneath the table top when the latter is in closed position, the sections of said leaves being hinged to each other in such manner as to permit a relative longitudinal adjustment one upon the other, and means for elevating said leaves into position for use.

3. In a device of the class described a centrally supported table, a sectional table top forming a part thereof adapted to be extended, table leaves suitably mounted in horizontal position beneath said table top sections, mechanisms operating to move said leaves automatically upwardly between the table top sections and maintained in a horizontal plane as said sections are moved apart, and connections between the sections of said table leaves to permit extension of the leaves to position without inverting of any of the parts thereof.

4. In a device of the class described a sectional table top, a central support therefor comprising a divided leg, each section of which is adapted to move with a respective section of the table top, a sectional table leaf with the sections resting horizontally one upon another face upwardly and normally retained in position beneath the table top sections when the same are closed, and mechanism for elevating said sectional leaf into position to permit positioning of the same between the table top sections when the same are moved apart without inverting the leaf sections and maintaining the same in a horizontal plane in all positions of adjustment.

5. In a device of the class described a centrally supported table, sectional leaves contained beneath the top thereof when the same is in closed position, one supporting the other thereupon when in position out of use, the sections of said leaves slidable one upon another, to permit extension thereof without rotation of the sections, hinges connected to the lowermost of said leaf sections and to the table and means connected to the table top to project said leaves upwardly into position to permit extension of the same when the device is opened.

IKE KARISH.

Witnesses:
THOMAS J. MORGAN,
GUSTAVO T. FRAENCKEL.

Copies of this patent may be obtained for five cents each, by addressing the "Commissioner of Patents, Washington, D. C."